United States Patent
Petschko et al.

(10) Patent No.: US 8,259,311 B2
(45) Date of Patent: Sep. 4, 2012

(54) METHOD FOR DETERMINING POSITION, LASER BEAM DETECTOR AND DETECTOR-REFLECTOR DEVICE FOR A SYSTEM FOR DETERMINING POSITION

(75) Inventors: Hansjoerg Petschko, Zurich (CH); Klaus Schneider, Dornbirn (AT)

(73) Assignee: Leica Geosystems AG, Heerbrugg (CH)

( * ) Notice: Subject to any disclaimer, the term of this patent is extended or adjusted under 35 U.S.C. 154(b) by 445 days.

(21) Appl. No.: 12/599,483

(22) PCT Filed: May 5, 2008

(86) PCT No.: PCT/EP2008/003590
§ 371 (c)(1), (2), (4) Date: Nov. 9, 2009

(87) PCT Pub. No.: WO2008/138507
PCT Pub. Date: Nov. 20, 2008

(65) Prior Publication Data
US 2010/0302557 A1    Dec. 2, 2010

(30) Foreign Application Priority Data
May 10, 2007 (EP) ..................................... 07107971

(51) Int. Cl.
*G01B 11/14* (2006.01)
(52) U.S. Cl. ............. 356/624; 33/281; 33/282; 33/385; 250/559.29; 250/559.39; 356/139.1
(58) Field of Classification Search ..................... 33/281, 33/282, 285; 250/559.29–559.39; 356/138–155, 356/614–624
See application file for complete search history.

(56) References Cited

U.S. PATENT DOCUMENTS

| 4,897,538 | A | 1/1990 | Lemaire et al. |
| 4,912,643 | A | 3/1990 | Beirxe |
| 5,057,833 | A | 10/1991 | Carlson |
| 5,100,229 | A | 3/1992 | Lundberg et al. |
| 5,579,102 | A | 11/1996 | Pratt et al. |
| 6,171,018 | B1 * | 1/2001 | Ohtomo et al. ............. 404/84.5 |

FOREIGN PATENT DOCUMENTS

| EP | 1710602 A1 | 10/2006 |
| GB | 1482753 | * 8/1977 |
| GB | 1482753 A | 8/1977 |

\* cited by examiner

*Primary Examiner* — Kara E Geisel
*Assistant Examiner* — Iyabo S Alli
(74) *Attorney, Agent, or Firm* — Maschoff Gilmore & Israelsen (57) ABSTRACT

The invention relates to a system for determining a position by emitting a first laser beam (7) by a laser source (6) positioned in a reference system onto a detector (1) and simultaneously detecting the first laser beam (7) by the detector (1), thus defining an emission direction of the laser source (7). The detector (1) has a segmented detection area comprising a plurality of discrete partial detection areas (17), each having a defined partial detection direction and at least two partial detection directions thereof being different. When detecting the first laser beam (7), an impingement point (9) of the first laser beam (7) on the detector (1) is detected by means of at least one partial detection area (17), and when determining the incidence direction (10), said direction is derived from the at least one partial detection direction. The location of the detector (1) relative to the laser source (6) and the reference system is then determined using the emission direction and the incidence direction (10).

23 Claims, 7 Drawing Sheets

METHOD FOR DETERMINING POSITION, LASER BEAM DETECTOR AND DETECTOR-REFLECTOR DEVICE FOR A SYSTEM FOR DETERMINING POSITION

The invention relates to a method for determining attitude a use of the method for determining attitude, a laser beam detector and a detector-reflector device.

BACKGROUND

The attitude determination, i.e. the position and/or orientation determination, of an object, for example of a mobile machine, by means of a total station has long been known. For example, a reflective prism is mounted on the latter in a position known relative to the object and is measured by means of a total station having a laser beam. The reflected beam is received by the total station. By means of a phase or time difference of the emitted and the received beam, the distance from the reflector to the total station is derived and the solid angle of the object relative to the total station is determined on the basis of the emission direction of the beam, so that the position of the object can be determined.

Further measurements which are linked to the position and generally also require a knowledge of the orientation of the object in space are then carried out starting from a position determined by such a system. In principle, the orientation can also be derived from the position determination of two or more points. For applications involving measurement, the 6 degrees of freedom of the object, but at least the position and hence 3 degrees of freedom, have to be determined for unambiguously establishing the absolute position in space. The problem therefore comprises the determination of position and orientation as two tasks which can be achieved in principle separately but for many applications have to be carried out in association. As a rule, both position and orientation or alignment of an object are therefore required.

For the additional determination of the alignment of the object, systems of the prior art use, for example, a plurality of reflective elements which are mounted with known position relative to one another and to the machine. By measurement of the plurality of reflectors and by means of the known relative position of the reflectors to one another, the alignment of the machine is determined. A disadvantage of such systems is the complicated measurement of the plurality of reflective elements or the erection and operation of a plurality of total stations.

A further known possibility for determining the alignment of an object in a horizontal plane is the use of a compass.

The prior art also discloses the determination of the position of a mobile machine by means of a GPS receiver which, for example, is mounted on the machine or integrated in the machine. For additional determination of the alignment of the machine, however, at least two GPS receivers mounted a horizontal distance apart on the machine are required. The position of each individual receiver is determined on the basis of known GPS position determination and the alignment of the machine is determined by means of the known relative position of the receivers. However, visual contact with at least three, preferably at least four satellites must always exist for position determination via GPS, which however is not the case for work under bridges, in narrow passages between houses or due to other obscurations. Furthermore, the accuracy of measurement of the position, in particular of the vertical position, of a machine is lower in the case of satellite position determinations in comparison with the accuracy in geodetic surveys.

Consequently, with corresponding requirements, the use of high-precision optical measuring methods, as are known from geodesy, are still advantageous.

In a further known possibility for providing information about the orientation of a machine, the position of the machine is tracked and a direction of travel is determined from the changes in position. With the assumption that the direction of travel corresponds to a certain orientation of the machine, information about the orientation of the machine can be derived therefrom. A drift during the movement of the machine is not taken into account in this method.

WO 2006/070009 describes a method for determining the position and the alignment of an object using a rotating laser and two detectors. The rotating laser emits a horizontal laser beam which is associated with angle-dependent information and is received in each case by the two detectors mounted in a known position on the machine. The position and the alignment of the machine relative to the rotational laser are derived from the angle information received in each case and the positions of the detectors relative to one another.

The generally known methods and systems of the prior art for determining the position and the alignment of an object always require separate measuring processes to at least two measuring points a horizontal distance apart. This is frequently very complicated and may be inaccurate and unsuitable for certain requirements, such as, inter alia, for surveying an object having a very small horizontal dimension. As already mentioned, the limited nature of the potential uses of GPS systems are always disadvantageous.

WO 2006/097408 describes an attitude determination method for determining position and orientation of a unit. There, the approach is based on the determination of the position of the unit by a scanning system, for example a laser scanner. The determination of the orientation of the unit is effected by a measurement of the attitude of a receiver arranged on the unit relative to the beam axis of the radiation emitted by the scanning unit. From the knowledge of the attitude of the receiver relative to the beam axis and the knowledge of the attitude of the receiver relative to a carrier component of the unit, the orientation of the unit can be derived. Knowledge of the attitude in space thus follows from the position information and the orientation information.

Since the orientation is determined on the basis of an offset of the receiver relative to the beam axis, and the optical system of the receiver has only a limited opening angle, the alignment of the receiver must always correspond approximately to the beam axis or the beam axis must constantly attract the movement of the unit. At a fixed point in time, the receiver is therefore able to receive only in a certain limited angular range.

SUMMARY

It is the object of the invention to provide a simplified optical method for determining the alignment and the position of an object, in particular in a single measurement process by a total station. There should be readiness to determine the orientation and the position of the object in its arbitrary instantaneous orientation and from arbitrary positions in space without tracking by an optical system of the receiver.

A further object of the invention is the provision of an improved laser beam detector for determining an incidence direction of a laser beam and of a detector-reflector device for an attitude determination system.

The method for determining attitude according to the invention for determining the alignment of a detector which detects an impingement point of a laser beam uses a laser source for emitting a first laser beam and optionally a reflective element, the position of which relative to the detector being known.

Three directions are used below. The term "reflective direction" is to be understood as meaning the direction of the reflective element—measured from the laser source. The "emission direction" is specified as the direction of the detector from the laser source in which the first laser beam is emitted. An "incidence direction" indicates the direction of the first laser beam relative to the detector, i.e. the direction from which the first laser beam impinges on the detector, in particular projected into a horizontal plane.

According to the invention, the method comprises emission of the first laser beam in the direction of the detector, the emission direction being defined. Optionally, the emission direction can be derived from the reflector direction. A determination of an impingement point of the first laser beam on the detector follows. From this impingement point, the incidence direction is derived. On the basis of a linkage of the incidence direction with the emission direction, the determination of the alignment of the detector relative to the laser source is now possible.

The reflector direction is preferably detected using a total station in which, inter alia, the laser source can be integrated. The detection can be effected by reception of a reflected part of the first laser beam or by means of emission and reception of a second laser beam, as disclosed in the prior art. In addition, a distance of the reflective element can be determined here. Also conceivable, however, is detection of the reflector direction by means of camera recordings of the laser source, which are evaluated by image processing.

The laser beam detector according to the invention for an attitude determination system has a detection region which is arranged in particular about a vertical axis and covers a planar angular range of at least 180°, in particular at least 270°, preferably substantially 360°. The detecting region of the detector is formed for detecting a laser beam and consists of a plurality of detection zones, with the result that the detection region is segmented into a plurality of partial detection regions. By reception of the beam within a detection zone, an impingement point of the laser beam on the detector can be determined. Each detection zone is directly linked to a planar angle, in particular about the vertical axis, which corresponds to a partial detection direction. The incidence direction of the laser beam and hence also the alignment of the detector relative to the incidence direction can be determined therefrom. By covering a planar reception region of substantially 360°, the laser beam detector is able to receive laser beams from any desired directions without a rough preorientation of the detector being necessary.

Owing to the respective coordinated partial detection region, each detection zone covers a defined azimuthal angular range so that—depending on the impingement point of the laser beam on the detector—the incidence direction can be derived. For this purpose, the detection zones are arranged around an—in particular vertical—axis with a radial orientation, for example side by side and adjacent to one another.

The detector-reflector device according to the invention for an attitude determination system has a laser beam detector according to the invention for determining a laser beam impingement point as a detector and a reflective element as a reflector. The reflective element and the laser beam detector are arranged in known positions relative to one another.

A detection zone can be defined as having exactly one sensor element or as having a plurality of sensor elements. In the second case, however, a lower angular resolution is achieved than would be possible by the number of sensor elements per se. In the first case, a detection zone could furthermore be defined as exactly the detection area of one sensor element but also as a zone larger than the detection area of the one sensor element. If the zone is defined as being larger than the sensor element, a large detection region could be defined in a less complicated manner. However, there would then be the possibility that a beam incident in the detection zone and having a sufficiently small cross-section may not be detected at all. Sensor elements used may be, for example, photodiodes, CCD sensors, CMOS sensors or PSD sensors. If the laser beam has such a large beam cross-section that it is detected by a plurality of zones, the centre of area or the centre of intensity of the impingement area can be determined as the impingement point. If the detection region consists, for example, of 180 detection zones which are arranged adjacent to one another in an arc around the vertical axis and cover in each case a radial angular range of 2°, a planar angle which reflects the relative incidence direction of the laser beam can be measured with an accuracy of one degree.

As is known from the prior art, the reflective element may be in the form of an all-round prism, in the form of a cat's eye or in the form of a reflective foil, so that an incident laser beam is at least partly reflected back into the incidence direction. By measuring the reflective element by means of a total station, distance information and a direction of the reflective element in space relative to the total station can be determined in a known manner, from which a relative 3D position of the element can be determined.

A possible embodiment of the detector-reflector device is an arrangement of the detector and of the reflective element on a common vertical axis. The horizontal component of the reflector direction then corresponds to the horizontal component of the emission direction. If the all-round prism is measured by means of the total station and, for example, the total station additionally emits a vertically fanned laser beam in the same horizontal direction as that for measuring the all-round prism, both the alignment of the detector, according to the invention, and the position of the prism can be determined in a single operation.

A further possible embodiment of the detector-reflector device constitutes integration of the detector in the reflective element. On measuring the reflective element with a laser beam, the latter can be simultaneously detected by means of the detector zones. An impingement point of the laser beam on the device is determined in order to determine the incidence direction therefrom. The alignment of the device can then be derived from the incidence direction. Both the relative 3D position and the relative alignment of the detector-reflector device can thus be determined in a single measuring process.

If the detector-reflector device according to the invention is mounted on an object, such as, for example, a mobile machine, the alignment of the detector relative to the alignment of the object being known, the relative alignment of the object can additionally be derived from the alignment of the detector determined according to the invention. If the detection region has a planar reception region of substantially 360°, the relative orientation of this object can be determined by means of a total station from an arbitrary position in space or in an arbitrary instantaneous orientation of the object.

The expression "alignment of an object" is always to be understood as meaning the alignment or orientation of the object projected into a reference plane which is generally tangential to the Earth's surface.

The alignment determination method according to the invention and the laser beam detector and the detector-reflector device are described in more detail below, purely by way of example, with reference to working examples shown schematically in the drawing. Specifically,

Figure 1:
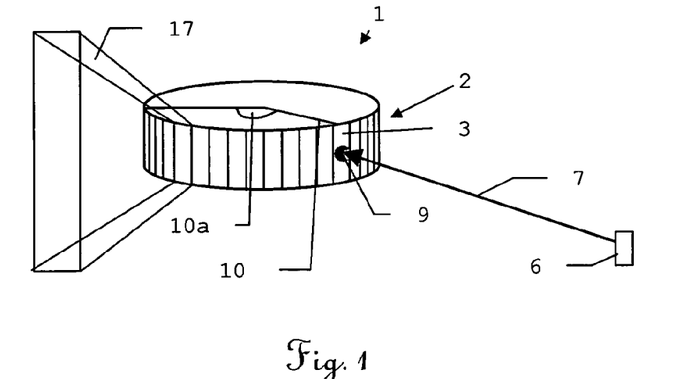
FIG. 1 shows a laser beam detector according to the invention for a method for determining attitude according to the invention.

FIG. 1 shows a laser beam detector 1 for determining an impingement point 9 for a method for attitude determination. In this method according to the invention, a laser source 6 emits a first laser beam 7 to the detector 1, the emission direction being defined. The first laser beam 7 is detected by the detector 1 at approximately the same time.

DETAILED DESCRIPTION

The detector 1 has a plurality of detection zones, for example 72 detection zones, which are arranged adjacent to one another on a lateral surface of a cylinder around a vertical axis. A detection region 2 of the detector 1 is a region of all detection zones 3. Each zone 3 covers, for example, an angular range of 5°, with the result that a segmented detection region of the detector 1 in a planar angular range of 360° results and the detection region has a corresponding number of discrete partial detection regions 17. A defined partial detection direction, for example as a direction from the corresponding detection zone 3 to the detector midpoint, is coordinated in a fixed manner with each partial detection region 17. Thus, the partial detection directions of the detection zones 3 are located with radial orientation in a circular disc and in each case differ from one another. On detection of the first laser beam 7 within at least one partial detection region 17, the detector 1 determines an impingement point 9 of the first laser beam 7 and derives an incidence direction 10 from the corresponding of at least one partial detection direction.

By linking the emission direction to the incidence direction 10, the attitude of the detector 1 relative to the laser source 6 is now determined.

The detection zones 3 of the detector 1 consist, for example, of CCD sensors, photodiodes or PSD sensors. If a laser beam is detected by a plurality of sensors with which different partial detection directions are coordinated, a point-like impingement point can be determined, for example, as the centre of area of the detected impingement area of the laser beam 7, and the incidence direction 10 can be determined therefrom. It is also possible to establish the centre of intensity of the detected radiation as an impingement point. Grazing impingement of the laser beam can then be determined, for example, on the basis of an asymmetric intensity distribution of the detected radiation and can trigger an error message regarding the measurement. Alternatively, however, the incidence direction of the laser beam could also be derived directly from such an asymmetric impingement intensity distribution. Thus, for example, a left impingement area edge point, a right impingement area edge point and a centre of intensity can be determined, and the incidence direction can be derived from the distance ratio of left and right edge point to the centre of intensity.

Figure 2:
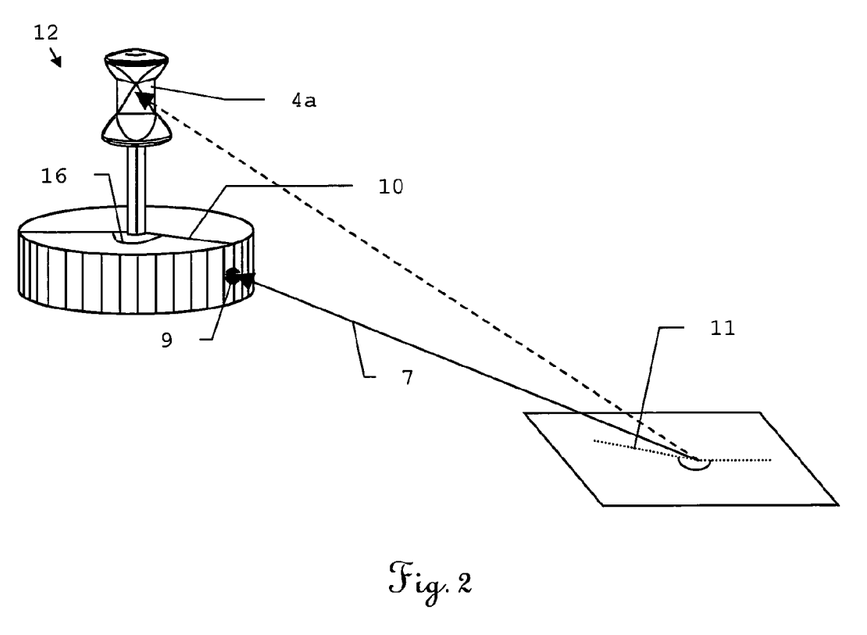
FIG. 2 shows an embodiment of a detector-reflector device according to the invention.

FIG. 2 shows a first embodiment of a detector-reflector device according to the invention for a method for determining attitude. The detector-reflector device has the detector 1, shown in FIG. 1, for detecting a laser beam and an all-round prism 4a as a reflective element. The detector 1 is connected to the all-round prism 4a by means of a vertical rod. Thus, the detector 1 and the all-round prism 4a are arranged in known positions relative to one another on a common vertical axis which corresponds to the main axis of rotation of the detector 1.

The all-round prism 4a is formed in order to be measured for example by means of a laser beam from a point in space. The reflector direction obtained thereby serves for deriving the emission direction 11 of the laser beam which is emitted in the direction of the detector.

Figure 3A:
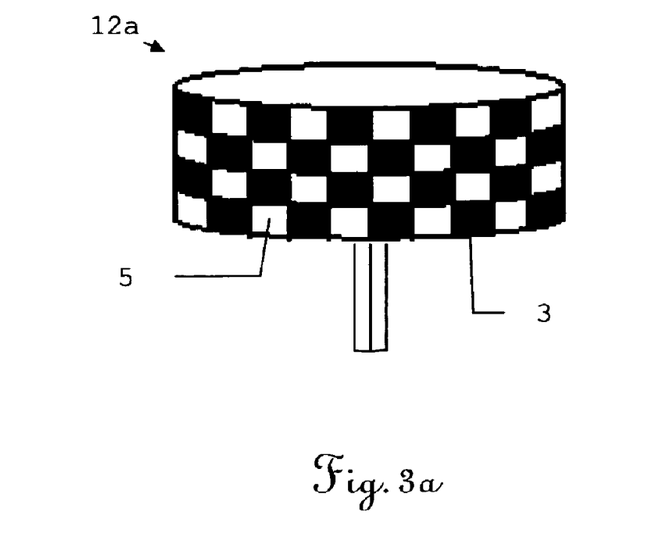
FIG. 3a shows a first integrated embodiment of a detector-reflector device.
Figure 3B:
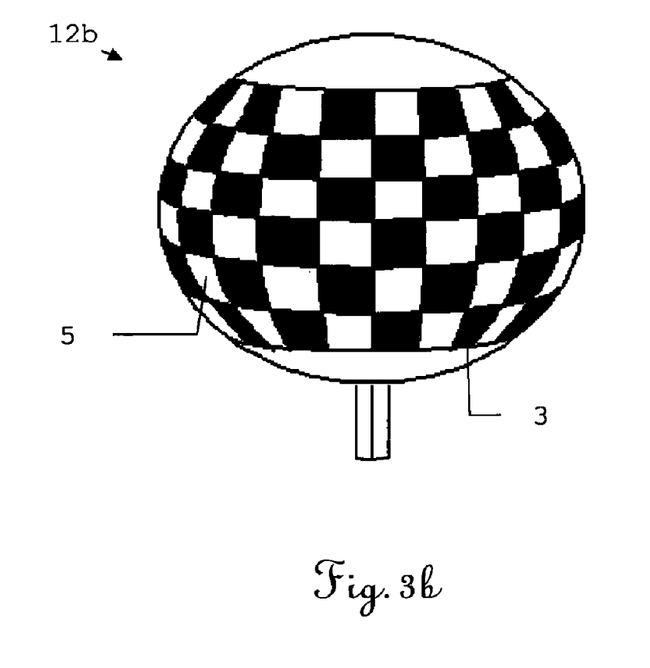
FIG. 3b shows a second integrated embodiment of a detector-reflector device.
Figure 3C:
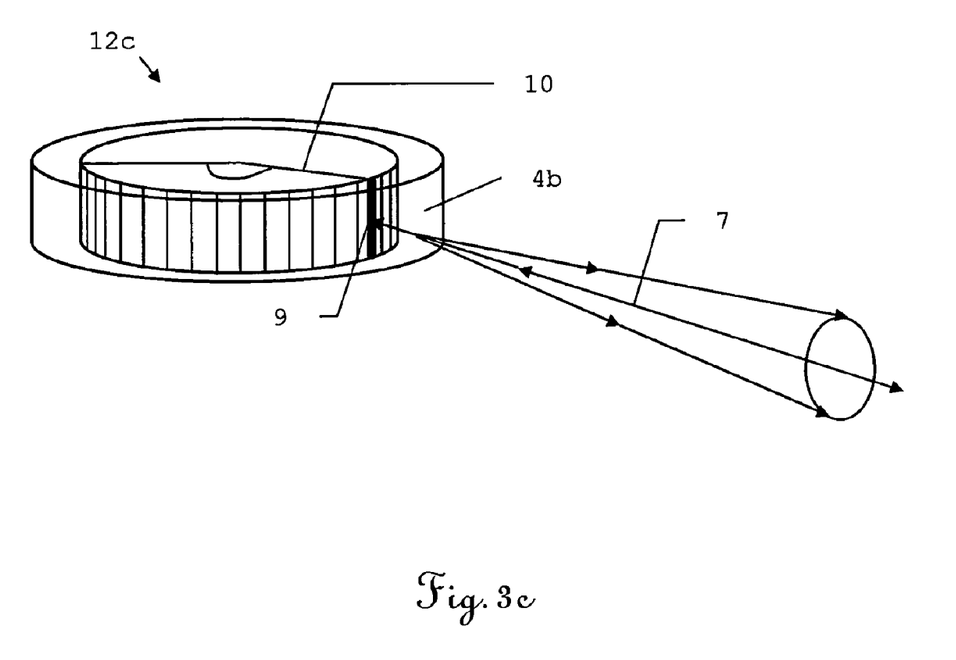
FIG. 3c shows a third integrated embodiment of a detector-reflector device.

FIGS. 3a, 3b and 3c show three integrated embodiments of a detector-reflector device 12a, 12b and 12c according to the invention.

In FIGS. 3 and 3b, the reflective element has a plurality of reflection zones 5 and the detection region has a plurality of detector zones 3. The reflection zones 5 are, for example, similar to cat's eyes or in the form of adhesively bonded reflective foils. The reflection and detection zones are attached in the manner of a chessboard on a lateral cylinder surface in FIG. 3a and on a part of the surface of a sphere in FIG. 3b and radially around a vertical axis. If one of the detector-reflector devices shown is measured, for example, by means of a total station, the measuring laser beam is simultaneously detectable by means of the detection zones 3. Each detection zone 3 is associated with angle information.

If the measuring laser beam is received within a detection zone 3, an incidence direction of the beam can be determined therefrom and hence the orientation of the device relative to the measuring beam and also relative to the total station.

In FIG. 3c, the lateral surface of a cylinder is formed as layer 4b partly transparent for a laser beam. An incident laser beam 7 is for the most part reflected by this layer. A small part of the beam is accordingly transmitted. The detection region is arranged within the cylinder, behind the partly transparent layer. The detection region is formed for detecting the transmitted part of the laser beam and for determining the impingement segment 9 thereof. The relative planar direction 10 of incidence of the laser beam can be derived on the basis of the impingement segment 9. If the device 12c is measured, for example, with a total station by means of a laser beam 7 and the 3D position is determined, the alignment of the device 12c can simultaneously be determined on the basis of the direction 10 of incidence of the laser beam derived by the integrated detector.

Figure 4:
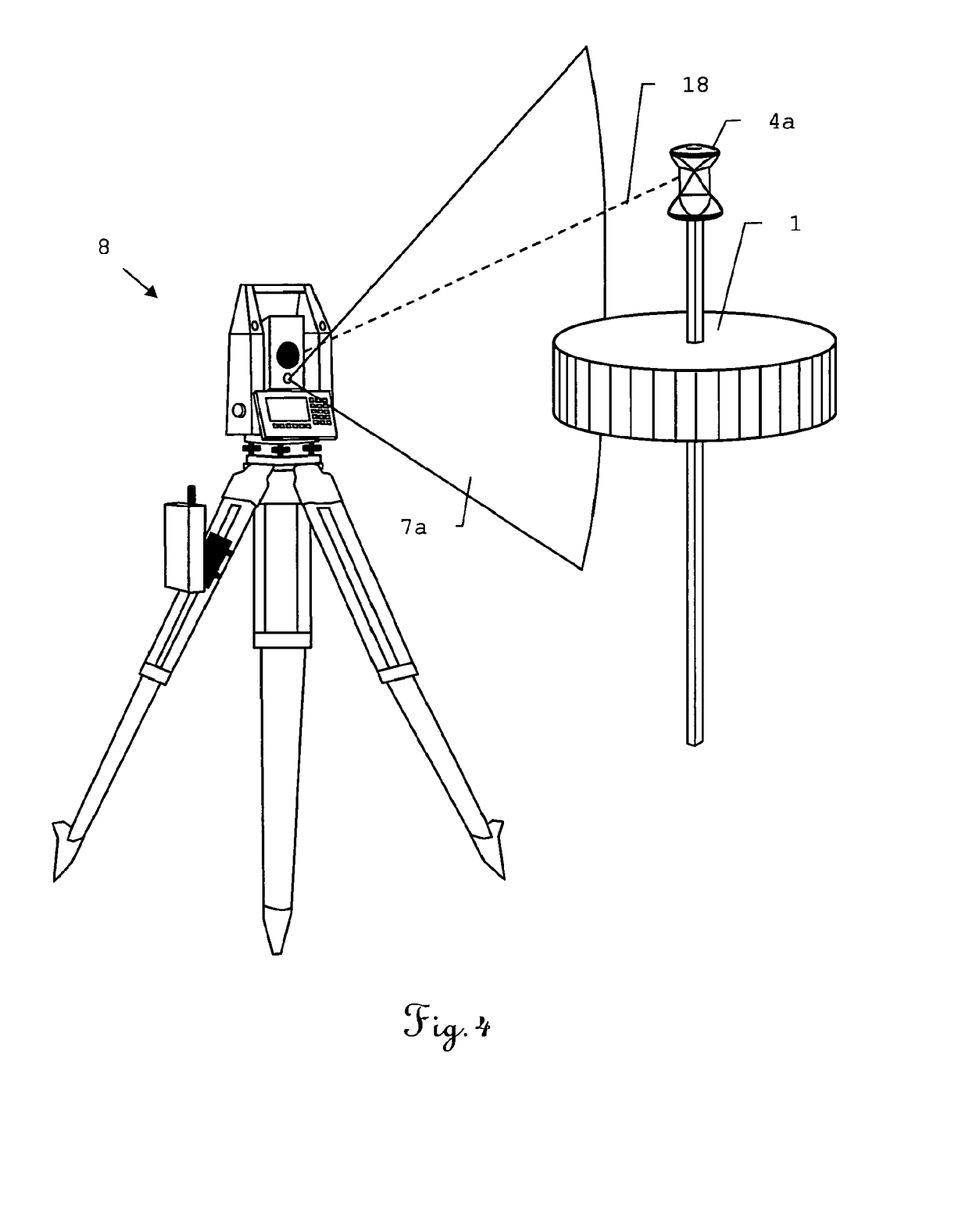
FIG. 4 shows a total station having a detector-reflector device as an alignment determination system.

FIG. 4 shows a system for determining attitude, comprising a detector-reflector device and a total station 8. An all-round prism 4a as a reflective element is arranged on a common vertical axis above the detector 1. The total station 8 measures to the all-round prism 4a using a laser beam 18 and determines the distance of the all-round prism 4a and the reflector direction on the basis of the reflected beam. In addition, in particular simultaneously or subsequently, the total station 8 emits a vertically fanned laser beam 7a in the direction of the detector 1, the emission direction being derived from the reflector direction—in which the laser beam 18 is emitted for measurement of the all-round prism 4a—or is predetermined by this reflector direction. The detector 1 receives a part of the vertically fanned beam 7a and determines the direction of incidence of the laser fan 7a from the impingement point on the detector. The alignment of the detector can be derived on the basis of this direction of incidence and the reflector direction determined by the total station 8. Thus, both the three-dimensional position and the alignment of the detector 1 can be determined in a single operation.

Figure 5:
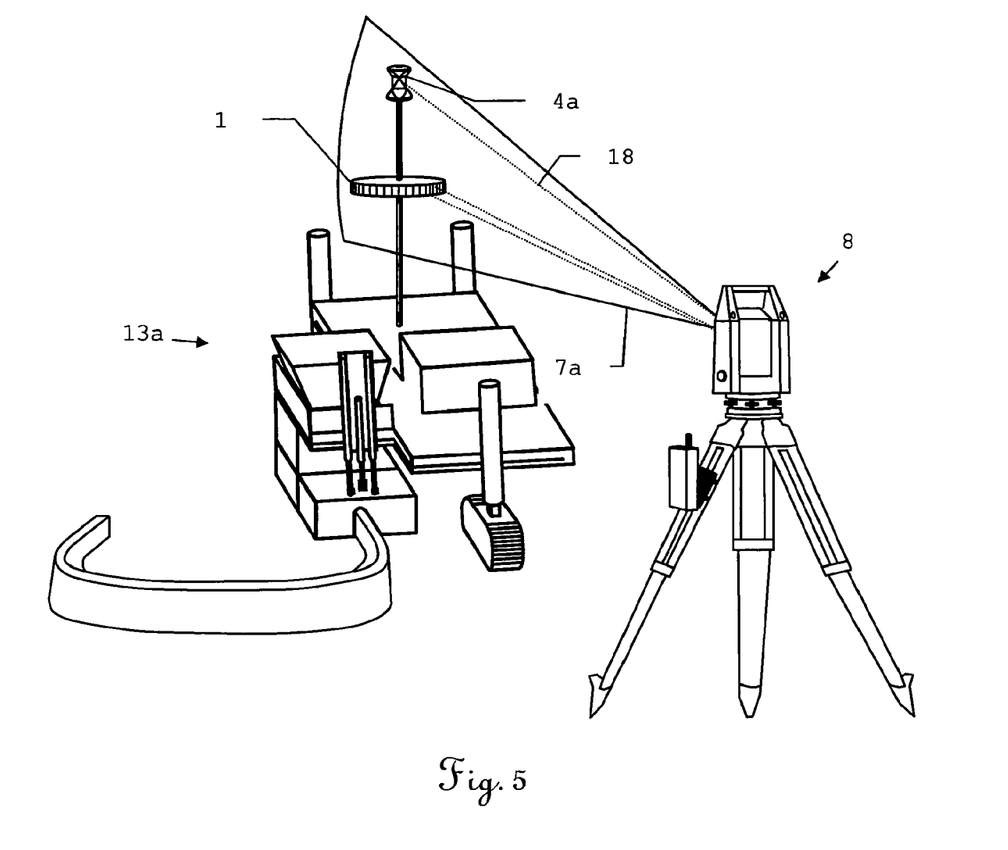
FIG. 5 shows a total station having a detector-reflector device which is mounted on a mobile machine.

FIG. 5 shows the system for determining attitude, shown in FIG. 4, the detector 1 and the all-round prism 4a being mounted by means of a vertical rod on a mobile work machine 13a. The alignment of the machine 13a relative to the detector 1 is known. Furthermore, the positions of the prism 4a and of the detector 1 relative to the work machine 13a are known.

According to the invention, the position and orientation of the work machine can now be determined by means of a total station 8 as follows in a single operation: the total station 8 measures to the prism 4a in a known manner by means of a laser beam 18, angle and distance to the prism 4a being determined, and in addition—for example simultaneously or directly subsequently—emits a vertically fanned laser beam 7a in the same azimuthal direction as the measuring laser beam 18. On the basis of the azimuthal direction of incidence of the laser fan 7a, determined according to the invention by the detector, the alignment or orientation can now also be determined as further information regarding the attitude of the work machine in the same operation and thus, for example, the 3D position of the mobile work machine 13a can be stated in a reference system. If the mobile machine 13a moves relative to the total station 8 and if the all-round prism 4a is additionally tracked in a known manner by means of the total station 8, the total station 8 continuously matching the emission direction of the first, vertically fanned laser beam 7a to the reflector direction, the 3D position and the alignment of the machine 13a can be continuously determined and the direction of movement, the speed and the sideways drift can be derived therefrom, depending on requirements.

Figure 6:
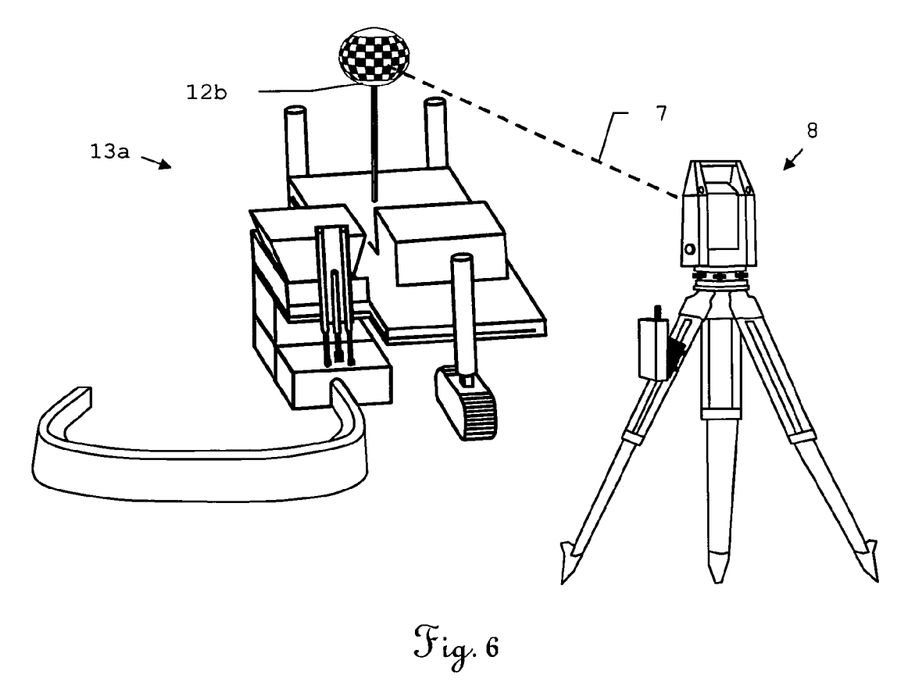
FIG. 6 shows a total station having a third integrated embodiment of a detector-reflector device which is mounted on a mobile machine.

FIG. 6 shows the integrated embodiment of the detector-reflector device 12b corresponding to FIG. 3b, which is mounted by means of a vertical rod on a mobile work machine 13a in known alignment relative to the machine 13a, and a total station 8, which measures to the device 12b using a laser beam 7. By means of the detection zones of the detector-reflector device 12b, the impingement point of the measuring beam on the device 12b is determined and the direction of incidence of the beam is derived therefrom. On the basis of the direction of incidence of the beam, the orientation of the machine 13a relative to the emission direction of the measuring beam and hence relative to the total station 8 is determined.

Figure 7:
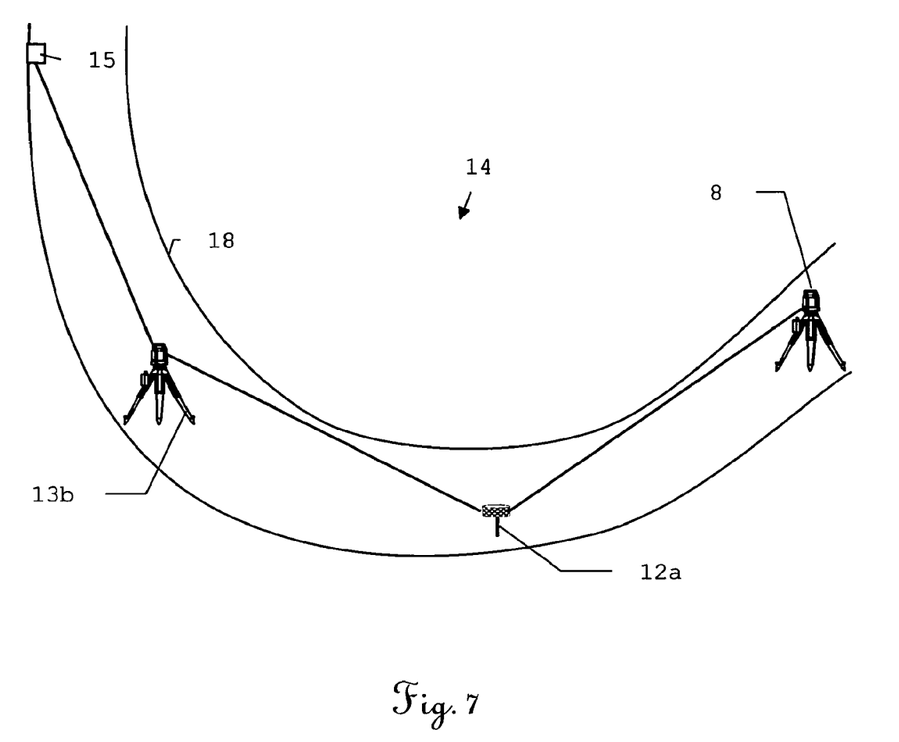
FIG. 7 shows surveying work in a curve of a tunnel by means of two total stations, a detector-reflector device being mounted on a total station.

FIG. 7 shows the surveying of an object, such as, for example, a monitoring camera 15, in a tunnel having a tunnel wall 18, there being no visual contact from the defined starting point of the measurement, where the first total station 8 is erected, to the camera 15. Alternatively, a second total station 13b and the detector-reflector device 12a are erected, via which indirect visual contact is permitted. The first total station 8 and the second total station 13b now each measure the relative direction in space and the distance to the detector-reflector device 12a. According to the invention, the two directions of incidence can now be determined simultaneously by means of the detector-reflector device 12a and can be related to one another. The position and the alignment of the second total station 13b relative to the first one 8 are derived therefrom. The second total station 13b then surveys the monitoring camera 15 in a known manner. On the basis of the determined alignment and the position of the second total station 13b relative to the first total station 8 and the position of the monitoring camera 15 from the second total station 13b, the position of the camera 15 from the first total station 8 can be derived by means of the traverse.

Of course, these figures shown are only examples of possible embodiments.

We claim:

1. A method for determining attitude, comprising:
   emitting a first laser beam by a laser source positioned in a reference system to a detector and simultaneous detection of the first laser beam by the detector, with the result that an emission direction of the laser source and an incidence direction to the detector are defined; and
   determining the attitude of the detector relative to the laser source and the reference system,
   wherein:
   the detector has a segmented detection region comprising a multiplicity of discrete partial detection regions which in each case have a defined partial detection direction and of which at least two partial detection directions differ;
   on detection of the first laser beam, an impingement point of the first laser beam on the detector is determined by means of at least one partial detection region and the incidence direction of the first laser beam to the detector is derived from the coordinated at least one partial detection direction; and
   as the attitude of the detector, at least the azimuthal alignment thereof is determined from the emission direction and the incidence direction.

2. A method for determining attitude according to claim 1, wherein:
   a reflective element is spatially coordinated with the detector in such a way that the position of the reflective element relative to the detector is known, the method further comprising determining a position of the reflective element relative to the laser source.

3. A method for determining attitude according to claim 2, wherein the reflective element includes an all-round prism.

4. A method for determining attitude according to claim 2, wherein the reflective element and the detector are positioned on a common axis and the first laser beam is emitted in a fan-like manner with an opening direction, the opening direction being oriented substantially parallel to the common axis.

5. A method for attitude determination according to claim 2, wherein, on determination of the relative position, measurement to the reflective element is carried out using a second laser beam, the emission direction of the first laser beam being predetermined by the direction in which the second laser beam is emitted for measurement to the reflective element.

6. A method for attitude determination according to claim 2, wherein, on determination of the relative position, measurement to the reflective element is carried out using a second laser beam simultaneously with or before the emission of the first laser beam, the emission direction of the first laser beam being predetermined by the direction in which the second laser beam is emitted for measurement to the reflective element.

7. A method for determining attitude according to claim 2, wherein the detector is integrated in the reflective element and, on determination of the relative position, the emission direction and a reflector direction, as the direction from the laser source to the reflective element, are determined.

8. A method for determining an alignment of an object using the method for determining attitude according to claim 1, the method including determining an alignment of the object carrying the detector and the reflective element including performing the method of claim 1.

9. A method for determining an alignment of a mobile finishing machine using the method for determining attitude according to claim 1, the method including determining an alignment of the mobile finishing machine carrying the detector and the reflective element including performing the method of claim 1.

10. A laser beam detector for performing a method for determining attitude, comprising:
   a detection region composed of a plurality of discrete detection zones, with each of which a defined partial detection direction is coordinated; and
   an impingement point of a laser beam on the detector being capable of being detected by at least one detection zone, wherein:
      the detection region covers a planar angular range of at least 180°;
      the partial detection directions of the detection zones are arranged with radial orientation in a circular disc; and
      the laser beam detector is formed for deriving an incidence direction of the laser beam from the impingement point, and for determining at least its azimuthal alignment relative to the laser beam from the incidence direction.

11. A laser beam detector according to claim 10, wherein a separate sensor element is coordinated with each detection zone.

12. A detector-reflector device comprising a laser beam detector according to claim 10, and a reflective element, the reflective element assuming a defined position relative to the detector.

13. A detector-reflector device according to claim 12, wherein the reflective element and the detector are arranged on a common vertical axis.

14. A detector-reflector device according to claim 12, wherein the reflective element includes an all-round prism.

15. A detector-reflector device according to claim 12, wherein the detector is integrated in the reflective element.

16. A detector-reflector device according to claim 12, wherein
   the reflective element has a plurality of reflection zones and the detection zones and reflection zones are arranged in the manner of a chess board.

17. A detector-reflector device according to claim 16, wherein the detection zones and the reflection zones are arranged on a lateral surface of a cylinder or on the surface of a sphere.

18. A detector-reflector device according to claim 15, wherein the reflective element has a reflection layer which is formed to be partly transparent for a laser beam and at least a part of the detection zones is arranged after the reflection layer, in particular is arranged within the reflective element.

19. A detector-reflector device according to claim 15, wherein the reflective element has a reflection layer which is formed to be partly transparent for a laser beam and at least a part of the detection zones is arranged within the reflective element.

20. Laser beam detector according to claim 10, wherein the detection region covers a planar angular range of at least 270°.

21. Laser beam detector according to claim 10, wherein the detection region covers a planar angular range of at least 360°.

22. Laser beam detector according to claim 10, wherein the detection region is composed of at least 36 discrete detection zones.

23. Laser beam detector according to claim 10 wherein the detection region is composed of at least 72 discrete detection zones.

* * * * *